Dec. 31, 1935.  W. HORRIDGE  2,025,815
CONSTRUCTION OF ROADWAYS
Filed July 7, 1933  7 Sheets-Sheet 1
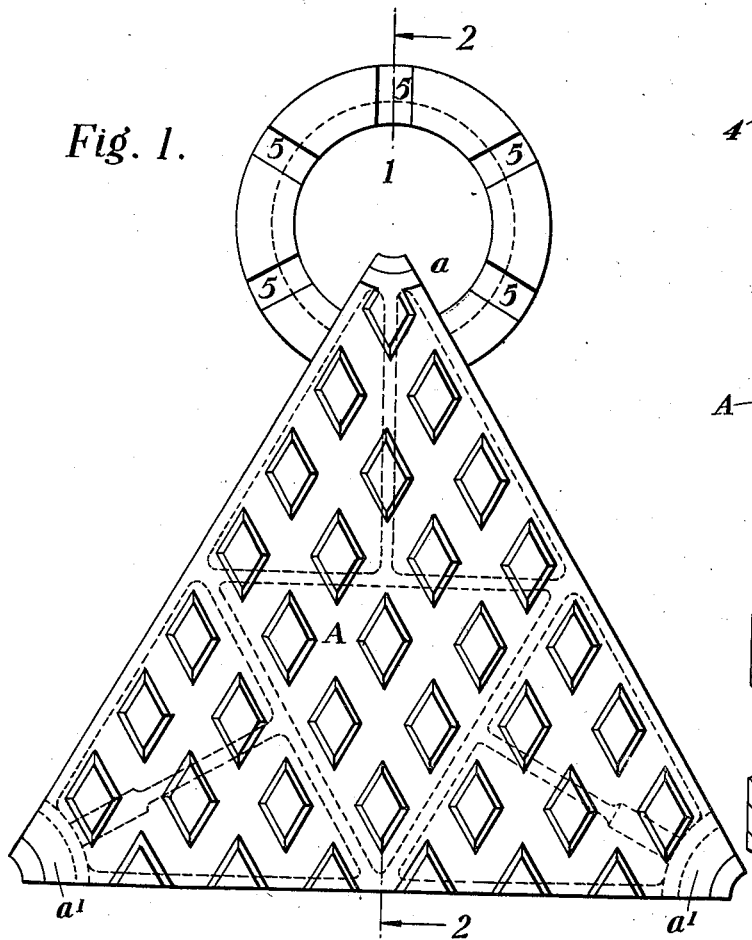
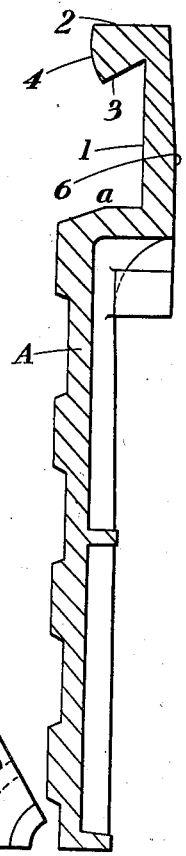
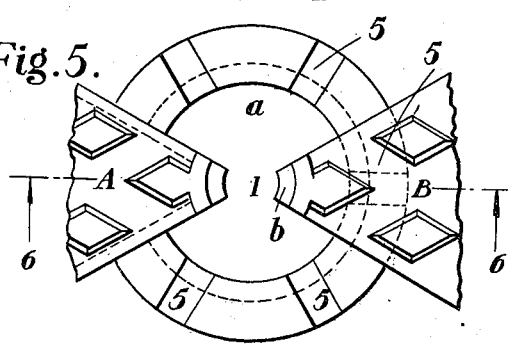
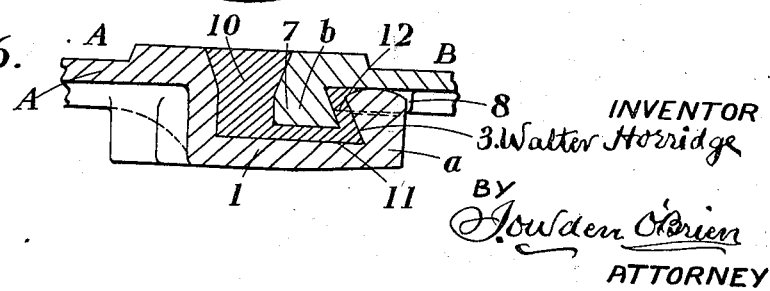
INVENTOR
Walter Horridge
BY Jowden O'Brien
ATTORNEY Dec. 31, 1935.  W. HORRIDGE  2,025,815
CONSTRUCTION OF ROADWAYS
Filed July 7, 1933   7 Sheets-Sheet 2
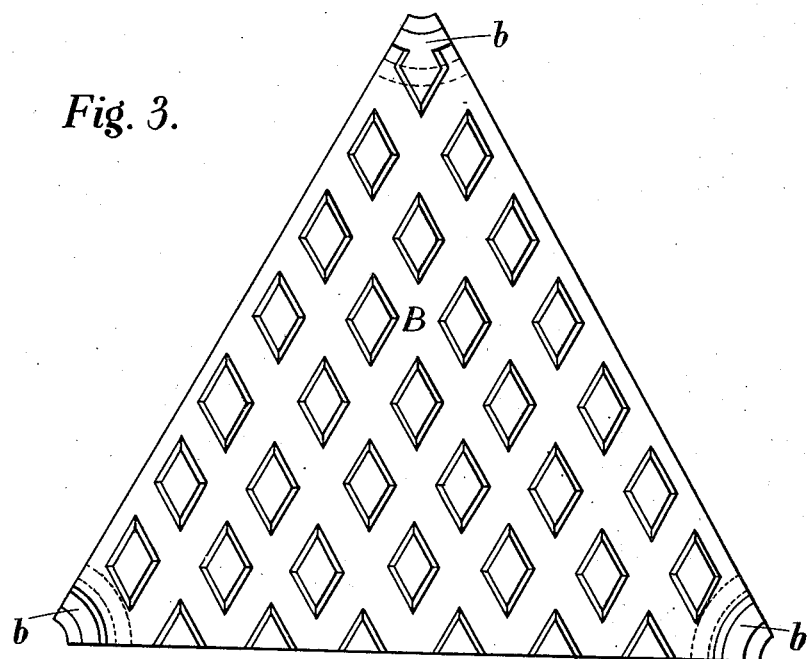
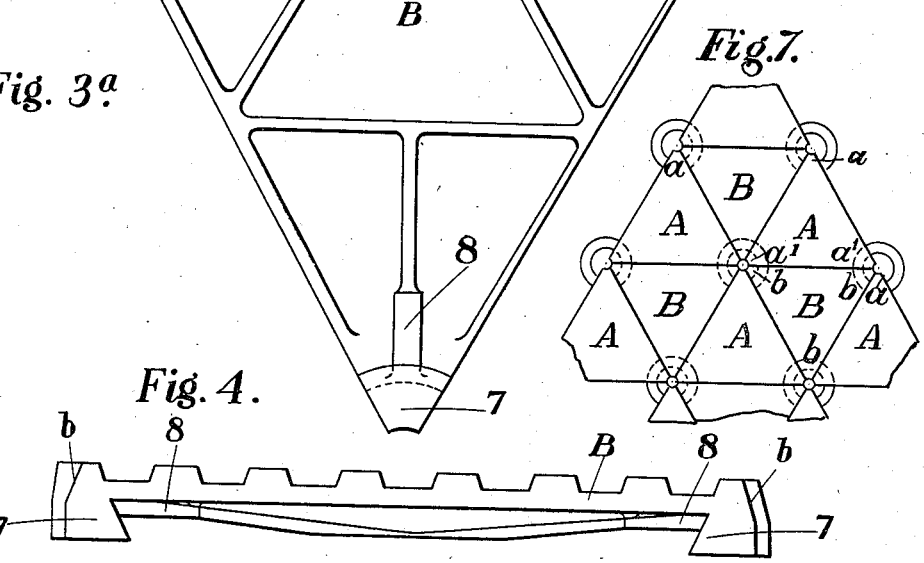
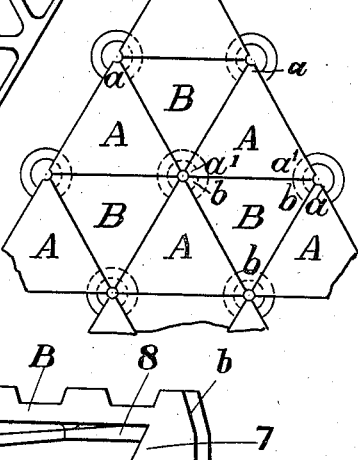
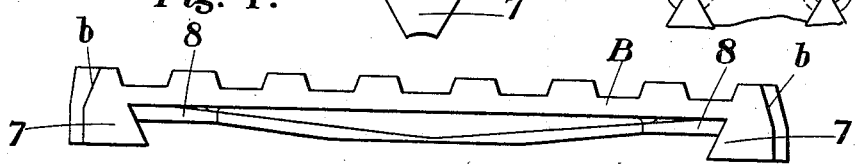

Dec. 31, 1935.  W. HORRIDGE  2,025,815
CONSTRUCTION OF ROADWAYS
Filed July 7, 1933   7 Sheets-Sheet 3
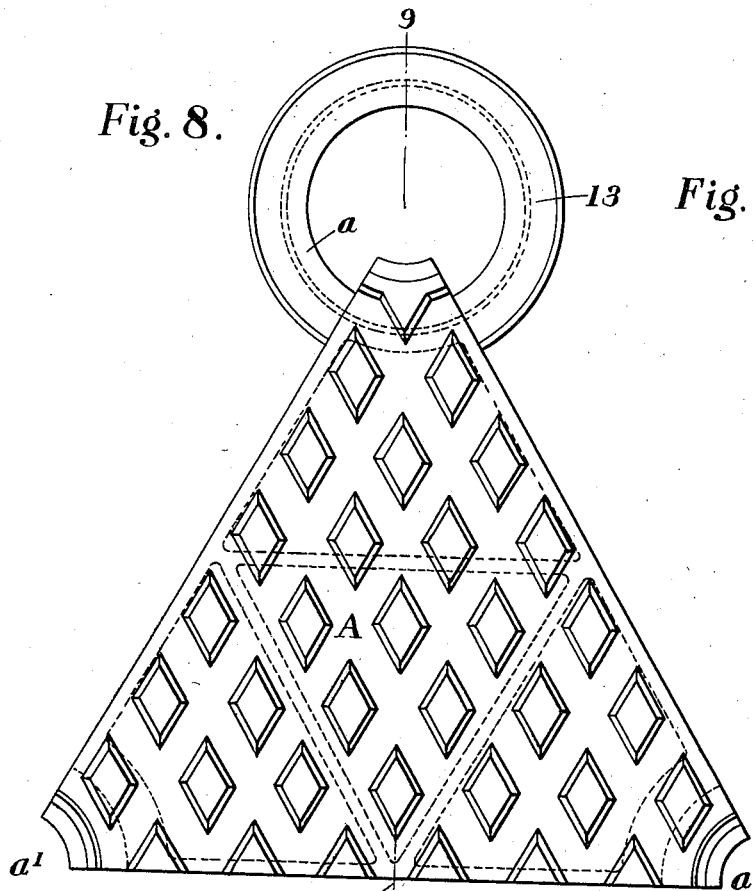
Fig. 8.
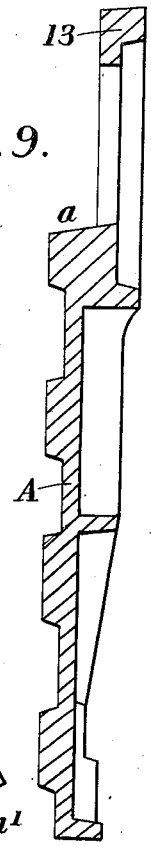
Fig. 9.
Fig. 13.
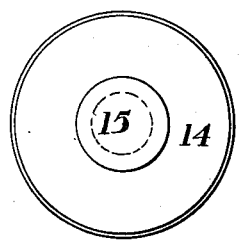
Fig. 14.
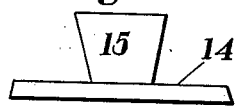
INVENTOR
Walter Horridge
BY
Howden O'Brien
ATTORNEY Dec. 31, 1935.  W. HORRIDGE  2,025,815
CONSTRUCTION OF ROADWAYS
Filed July 7, 1933   7 Sheets-Sheet 4

INVENTOR
Walter Horridge,
BY
J. Owden O'Brien
ATTORNEY

Dec. 31, 1935.  W. HORRIDGE  2,025,815
CONSTRUCTION OF ROADWAYS
Filed July 7, 1933  7 Sheets-Sheet 5
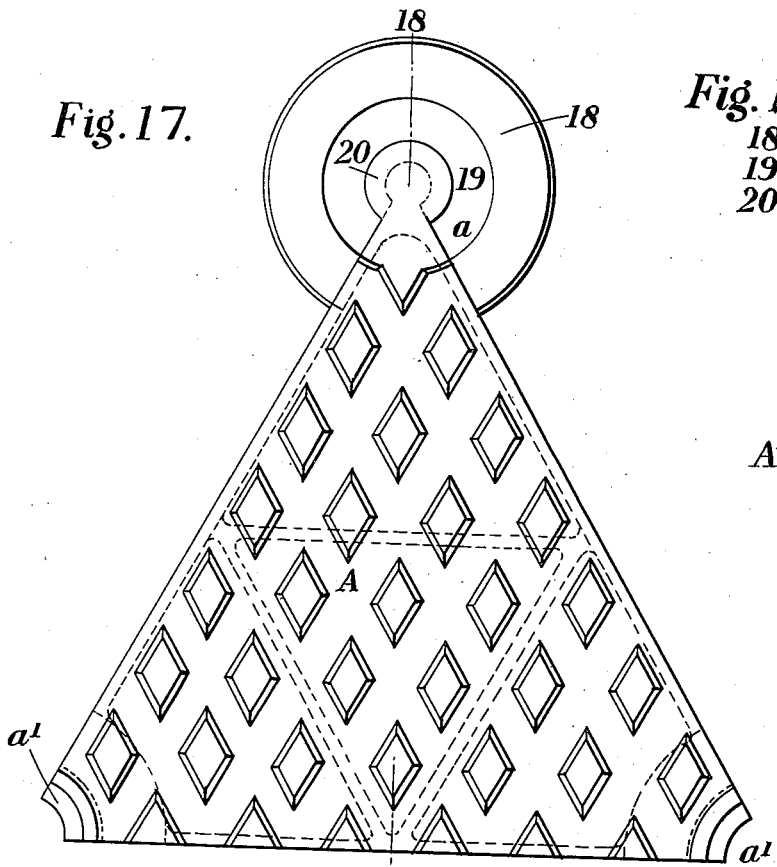
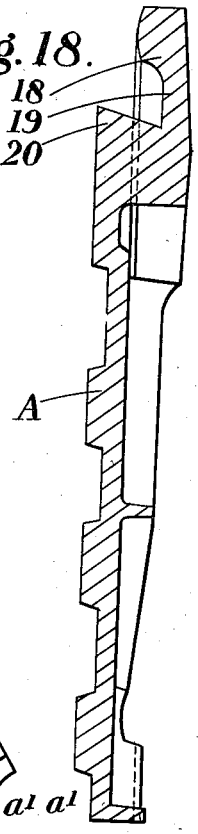
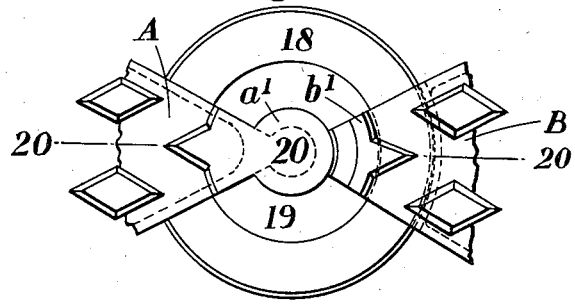
INVENTOR
Walter Horridge
BY
J. Owden O'Brien
ATTORNEY Dec. 31, 1935.  W. HORRIDGE  2,025,815
CONSTRUCTION OF ROADWAYS
Filed July 7, 1933   7 Sheets-Sheet 6
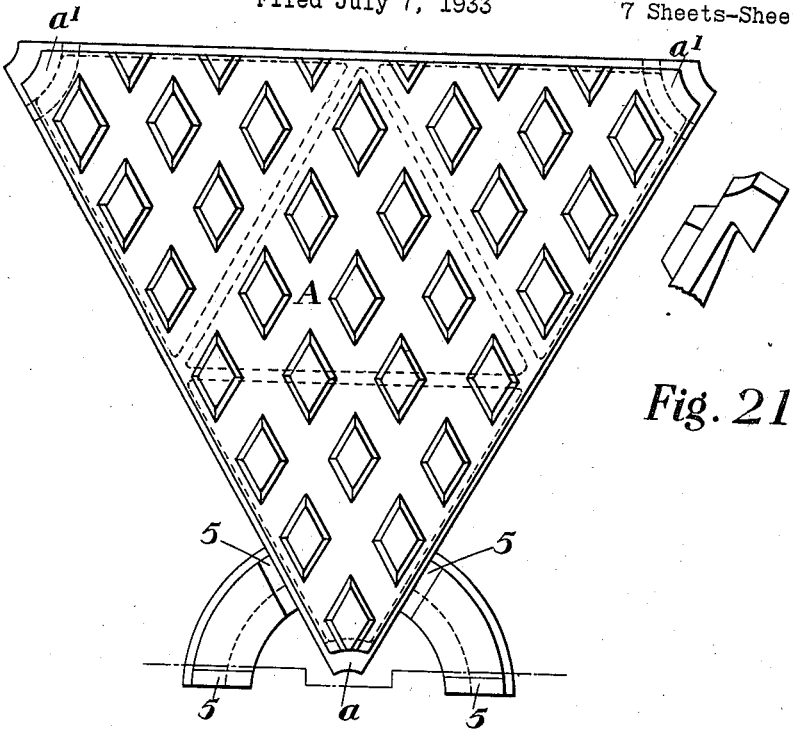
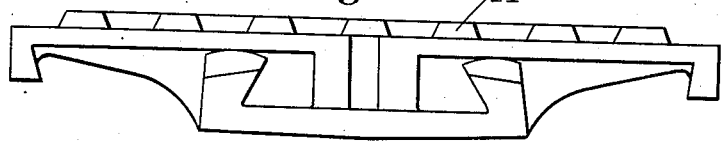
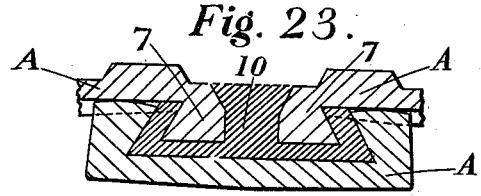
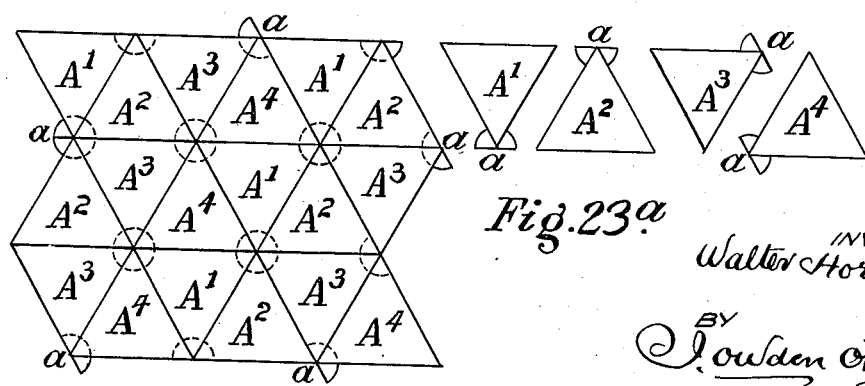
INVENTOR
Walter Horridge
BY
J. Lowden O'Brien
ATTORNEY

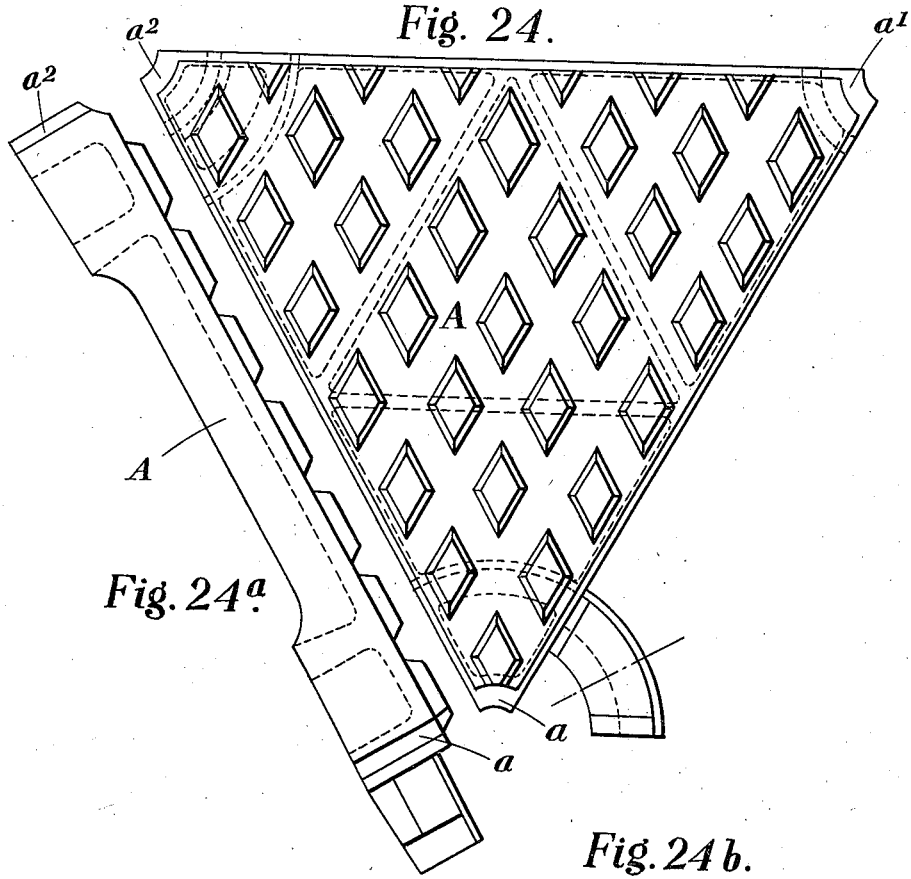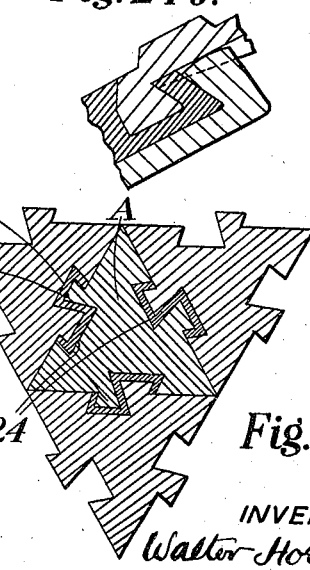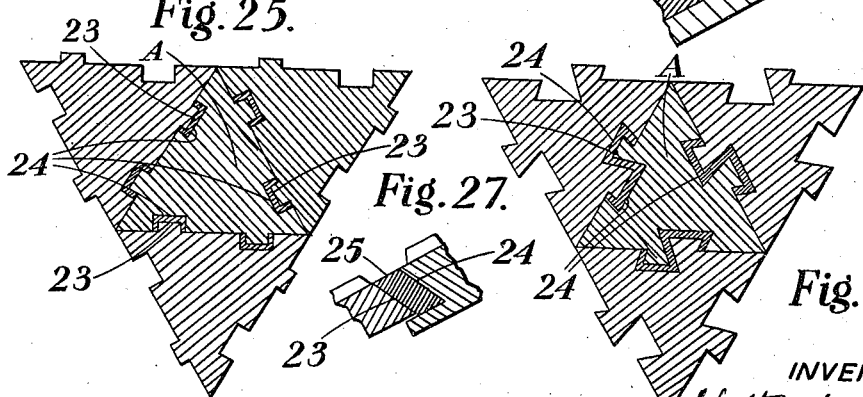

Patented Dec. 31, 1935

2,025,815

UNITED STATES PATENT OFFICE 2,025,815

CONSTRUCTION OF ROADWAYS

Walter Horridge, Bury, England

Application July 7, 1933, Serial No. 679,328
In Great Britain July 18, 1932

3 Claims. (Cl. 94—13)

This invention relates to improvements in the construction of roadways of the type having a surface formed from juxtaposed plates or slabs of triangular or other form laid on a bed of concrete or other material and to improvements in the plates or slabs forming such surface.

Although it is well known to employ substances such as bitumen as a filling for use between the edges of rectangular blocks composing road surfaces, for the purpose of sealing the road surfaces whilst permitting movement between the blocks to allow for expansion and contraction, it has not hitherto been proposed in roadways of the type to which the present invention relates to provide the plates with locking means the component parts of which interact with a key device which while normally preventing displacement of the plates will permit of movement thereof to allow for contraction and expansion due to thermal changes or movement arising from changes in the level of the bed and one of the objects of the present invention is the provision of such locking means.

According to one feature of the present invention which carries out the above mentioned object a roadway formed of juxtaposed plates or slabs laid on a bed of concrete or other material is provided with means to lock the plates or slabs together, the said means comprising locking members adapted to receive a key formed of bitumen, rubber or a material having properties analogous to those of bitumen or of rubber, to complete the locking, the locking members and keys serving normally to prevent displacement of the plates or slabs whilst permitting movement thereof to allow for contraction and expansion due to thermal changes or movement arising from changes in the level of the bed on which the plates are laid.

According to another feature of the present invention the surface of the roadway is formed from plates substantially triangular in form laid on a bed of concrete or other material provided at one or more corners with locking means composed of interlocking members formed wholly or partly integral with the plates or slabs, the said locking means serving to lock one plate or slab to another and also to provide support for the plates or slabs on the bed of the roadway.

A roadway constructed according to the present invention is thus formed from plates or slabs having locking means of such a nature as to permit of the plates being readily placed in position on the bed of the roadway and thereafter locked together by passing into the joint bitumen, rubber or a material similar to bitumen or to rubber to form the key between the component parts of the locking means thereby normally preventing displacement of the plates whilst permitting movement thereof to allow for contraction and expansion due to thermal changes or movement arising from the changes in the level of the bed.

Convenient embodiments of the invention will now be described by way of example with reference to the accompanying drawings, in which:—

Figs. 1 to 7 illustrate one form of the invention, in which the plates are of two kinds, the plates of one kind having at one corner thereof a locking ring and at the other corners locking members adapted to be interlocked with the locking rings carried by other plates, and the plates of the other kind having at each corner thereof similar locking members, but no locking ring.

Fig. 1 is a plan view of a plate of the first kind.

Fig. 2 is a section on the line 2—2 Fig. 1.

Fig. 3 is a plan view of a plate of the second kind.

Fig. 3a is a plan view from below.

Fig. 4 is a side view of the plate shown in Fig. 3.

Fig. 5 is a plan showing the locking member of one plate in position relatively to the locking ring of another plate.

Fig. 6 is a section on the line 6—6 of Fig. 5 and

Fig. 7 is a diagrammatic view showing the two kinds of plates laid together.

Figs. 8 to 16 illustrate another form of the invention, in which the locking means are of a different construction.

Fig. 8 is a plan view of a plate of the first kind.

Fig. 9 is a section on the line 9—9 of Fig. 8.

Fig. 10 is a plan view of a plate of the second kind.

Fig. 11 is a section on the line 11—11 of Fig. 10.

Fig. 12 is a plan view from below of the plate shown in Fig. 10.

Figs. 13 and 14 are plan and side views respectively of a locking centre.

Fig. 15 is a sectional view showing the locking ring of one plate, the locking member of another plate, and a locking centre in position, and Fig. 16 is a diagrammatic view showing the two kinds of plates laid together to form a road surface.

Figs. 17 to 20 illustrate another form of the invention, in which the locking means are of a further form of construction.

Fig. 17 is a plan view of a plate of the first kind.

Fig. 18 is a section on the line 18—18 of Fig. 17.

Fig. 19 is a plan view of the locking members of plates of the two kinds in position relatively to one another, and Fig. 20 is a section on the line 20—20 of Fig. 19.

Figs. 21 to 23a illustrate a further form of the invention in which all the plates are of the same kind, having at one corner a semi-circular locking member and at the other corners locking members adapted to be interlocked with the semi-circular locking members carried by other plates.

Figs. 21 and 22 are a plan, and elevation respectively of a plate of this form, Fig. 21a is a detail view of the corner of the plate and Fig. 23 is a section through one of the locking devices shown in position.

Fig. 23a illustrates diagrammatically a method of laying the plates shown in Figs. 21 to 23.

Figs. 24 and 24a are a plan and elevation respectively of a further modification in which each plate carries a locking member in the shape of one third of a circle at one corner, a locking member at the second corner, and a supporting foot at the remaining corner thereof and Fig. 24b is a section showing corner of one adjoining plate in position with bitumen key.

Figs. 25 to 27 illustrate diagrammatically a still further form of the invention, in which the locking devices are formed at the sides of the plates instead of at the corners, Figs. 25 and 26 showing two slightly differing forms of plates, and Fig. 27 a section through a locking device.

Figure 10:
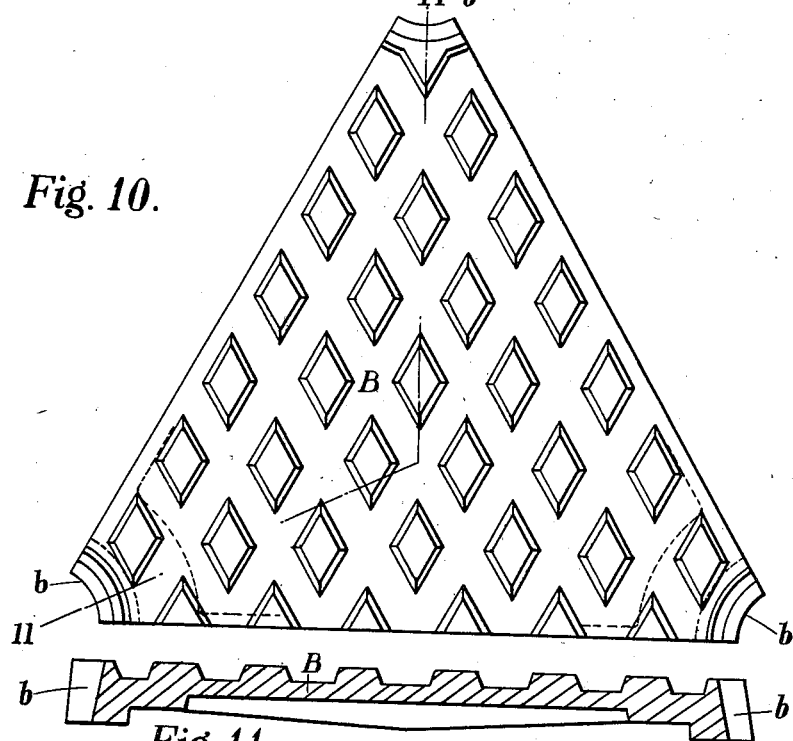

In the form of the invention shown in Figs. 1 to 7, the road surface is built up from a series of triangular plates A having a locking and supporting ring $a$ at one corner thereof and a locking member $a^1$ at the other corner and a series of triangular plates B having locking members $b$ at each corner thereof adapted to interact with a locking ring $a$ on the corner of a plate A. The plates A are arranged in rows with an intervening plate B between, whereby the locking ring $a$ of each plate A interacts with a locking member $a^1$ at the corners of two other plates A and with a locking member $b$ at the corners of three plates B. If the plates are in the form of equilateral triangles there is thus formed about each locking ring $a$ a hexagonal figure composed of the plate A on which the locking ring is formed, two further plates A the locking rings of which are on the periphery of the hexagon and at opposite sides, and three plates B arranged between the three plates A but it will be understood that the invention is not confined to plates in the form of equilateral triangles.

The locking ring $a$ is thus the only portion of the plates which comes in contact with the concrete bed and may therefore be cemented thereto as no contraction or expansion of the plates will cause movement of the ring.

The locking ring $a$ consists of a dish-shaped member 1 formed integrally with extending beyond and below the corner of the plate A, the outer face 2 of the member 1 being vertical or forming an acute angle with the bottom surface and the inner face 3 being undercut or inclined downwards. The upper surface 4 of the member 1 is preferably curved and if desired five equally spaced radial grooves 5 may be formed therein. The bottom surface 6 of the member 1 forms one of the supports for the plate and is at such a distance below the underside of the plate as will permit the latter to lie substantially horizontally when the other corners of the plate are supported by the locking rings of neighbouring plates.

The locking member $b$ at each corner of the plate B is in the form of a wedge or dovetail shaped member 7 formed integrally with the corner of the plate, the inclined face thereof corresponding approximately with the inclined inner face 3 of the dish-shaped member 1 of the plate A. Ribs 8 may be formed on the underside of the plate B corresponding with the grooves 5 in the face of the member 1.

The corners of the plates A which are not provided with a locking ring are formed with locking members $a^1$ of similar construction to the locking member $b$ formed at the corners of the plates B.

As shown in Figs. 5 and 6 when the plates A and B are laid together the locking member $b$ and the locking members $a^1$ of the plates forming the hexagonal figure with the plate A project over the top of the member 1, the ribs 8 being located in the grooves 5. When the plates are all assembled a space 10 is left in the centre of the locking ring $a$, a disc shaped space 11 below the locking members and an annulus 12 with inclined sides between the face of the member 7 and the inner face 3 of the member 1 of the locking ring.

The interlocking of the locking ring $a$ and the locking members $a^1$ and $b$ is then completed by pouring in bitumen until the spaces 10, 11 and 12 are filled, a key of bitumen being thus formed and the plates A and B being normally held locked together whilst movement is permitted to allow for contraction and expansion due to thermal changes or movement arising from changes in the level of the bed.

In the form of the invention shown in Figs. 17 to 20 a locking member $a$ is formed at one corner of the plate A and a locking member $a^1$ at each of the other corners, and a locking member $b$ is formed at each corner of the plate B, the plates A and B being laid together as hereinbefore described with reference to Figs. 1 to 7.

In this construction the locking member $a$ comprises a dish-shaped member 18 formed integrally with and extending beyond below the plate A and having a base 19 from which projects an upright central member 20 of inverted cone shape.

The locking members $a^1$ and $b$ of the plates A and B are shaped as shown to fit over the dish-shaped member 18 and have an inclined face 21 so that when they are assembled with the member 18 an inclined annular space 22 is formed between the faces 21 and the central member 20 into which bitumen is poured to form a key and to complete the locking of the plates A and B together whilst permitting movement to allow for contraction and expansion due to thermal changes or movement arising from changes in the level of the bed.

Figure 11:
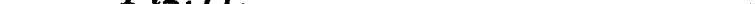
Figure 12:
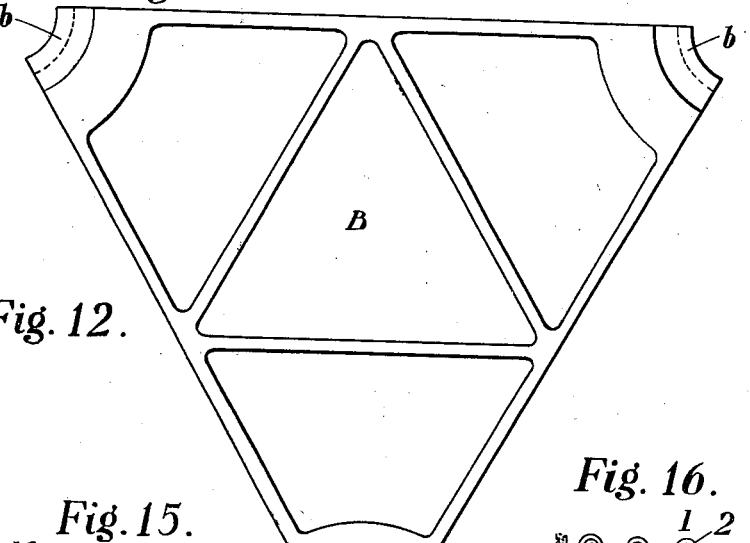
Figure 15:
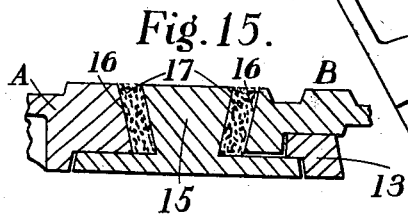
Figure 16:
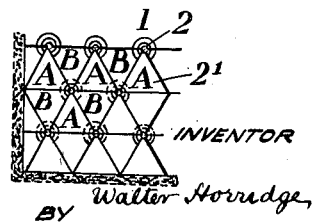

The construction shown in Figs. 8 to 16 is similar to that described with reference to Figs. 17 to 20 except that the locking centre is made separate from the plate A instead of being integral therewith. In this construction the locking member $a$ comprises an annular ring 13 formed integrally with the plate A and which fits over a separate locking centre comprising a circular base 14 and upright central member 15 of inverted cone shape.

The locking members $a^1$ and $b$ of the plates A and B are shaped as before to fit over the ring 13 and have an inclined face 16 so that when they are assembled with the ring 13 an inclined annular space 17 is formed between the faces 16 and the central member 15 of locking centre into which bitumen is poured to form a key and to complete the locking of the plates A and B together whilst permitting movement to allow for contraction and expansion due to thermal changes or movement arising from changes in the level of the bed.

According to further modifications of the invention plates may be provided with locking means including locking members which in plan are not complete circles.

Figs. 21 to 23 illustrate a plate A with a locking member $a$ which is semi-circular in form and which supports and interlocks with one corner of each of two adjacent plates. The locking members interlocking with the member $a$ may be of any of the types hereinbefore described, those shown in Figs. 21 to 23 being of the type described in connection with and shown in Figs. 1 to 7.

In a road surface composed of such plates as are shown in Figures 21 to 23 all the plates are of the same construction having a lock-member $a$ extending at one corner and a member $a^1$ similar to the locking members $a^1$ and $b$ shown in Figures 1 to 7, at each of the other corners, there being no plates with a locking member $a^1$ or $b$ at each corner. When the plates are laid in position each lock-member $a$ gives support to two other adjacent plates and interlocks with a locking member $a^1$ formed at one of the corners of each. When the plates are laid together as shown in Fig. 23a the locking members $a$ of two plates form a complete ring or disc.

If desired, in order to prevent any possibility of the various rows of plates becoming separated, the plates A1, A2, A3 and A4 may be arranged unsymmetrically, for example, in the manner shown (diagrammatically) in Figure 23a. Alternatively, the plates may be provided at their sides with locking devices, such as are shown in Figures 25 to 27 in addition to the locking devices at the corners.

Figures 24 and 24a show a further construction in which each plate is formed with a locking member $a$ in the shape of one-third of a complete circle, adapted to give support to an adjacent plate and interlock with a locking member $a^1$ at one corner thereof. The locking members interlocking with the member $a$ may be of any of the types hereinbefore described. Each such plate is formed with a locking member $a$ at one corner thereof, a locking member $a^1$ at another corner, and a supporting foot $a^2$ at the remaining corner. If desired, the plates may also be provided at their sides with locking devices, as described in connection with Figures 21 to 23.

In all the constructions shown in Figures 21 to 24a the locking is completed as hereinbefore described by a bitumen key which completes the locking of the plates together whilst permitting movement to allow for contraction and expansion due to thermal changes or movement arising from changes in the level of the bed.

In the constructions described with reference to Figures 1 to 20 each of the plates A is directly supported on the bed of the roadway at one corner only, the other corners at $a^1$ resting upon and being supported by the members $a$ of adjacent plates, and the plates B are supported by the locking members $b^1$ resting upon members $a$ of the plates A. In the construction shown in Figures 21 to 23 each plate is directly supported on the bed at one corner only, the other corners resting upon and being supported by the members $a$ of adjacent plates, whilst in the form shown in Figures 24 and 24a each plate is directly supported on the bed at two corners, one by the locking members and the other by the foot, the third corner resting upon the locking member of an adjacent plate.

The invention also includes other modifications in which some of the plates are provided with locking members such as the locking members $a$ shown in and described with reference to the preceding figures, at more than one of their corners, and, if desired, the plates may be provided, in addition to locking members at one or more corners thereof, with locking devices such as are shown in Figures 25 to 27 at their sides. Moreover, although the locking members $a$ hereinbefore described and shown have been circular or part-circular in form, they may if desired be in the form of hexagons or parts of hexagons, or other convenient shapes.

For the purpose of making up the edges of road surfaces composed of triangular plates or slabs according to this invention, fractional plates or slabs may be employed having at their corners one or more locking members for engagement in the locking rings or the like of adjacent plates or slabs and one or more supporting feet as may be required. Where plates or slabs of other than triangular form are used making-up plates or slabs of suitable shape may be employed in a similar manner.

According to the invention the surface of the roadway may also be composed of plates or slabs of any convenient shape having locking devices completed by means of a bitumen key formed in the sides thereof. In Figures 25 to 27 a construction is shown in which triangular plates are provided with dovetail projections and recesses at their sides. In this arrangement dovetail projections 23 on the sides of the plates project into correspondingly shaped recesses 24 on the sides of adjacent plates, the projections 23 and recesses 24 having either parallel sides as shown in Figure 25 or inclined sides as shown in Figure 26. The projections 23 are smaller than the recesses 24 so that a locking space 25 is formed when the plates are assembled together, which is filled with bitumen to form a key and to complete the locking whilst permitting movement of the plates to allow for contraction and expansion due to thermal changes or movement arising from changes in the level of the bed.

In all the forms of the invention the plates or slabs are preferably formed of cast iron but the invention is not limited to such material and any other suitable material may be employed for the construction of the plates or slabs.

What I claim as my invention and desire to protect by Letters Patent is:—

1. A roadway having a surface formed from two series of juxtaposed triangular plates supported at their corners and laid on a bed of concrete or other material comprising a first series of plates, a supporting ring formed integrally with and extending below the lower level of each plate at one corner thereof and a dovetailed shaped member formed integrally with and extending below the lower level of each plate at each of the other two corners to rest on the supporting rings of adjacent plates, a second series of plates, a dovetailed shaped member formed integrally with and extending below the lower level of each plate at each corner thereof and a bitumen key in the center of each ring and surrounding the dovetail members to lock the several plates in position whilst permitting movement of the upper plates in relation to the rings to allow for contraction or expansion of the plates.

2. A roadway having a surface formed from two series of juxtaposed triangular plates supported at their corners and laid on a bed of concrete or other material comprising a first series of plates, a recessed supporting ring formed integrally with and extending below the lower level of each plate at one corner thereof and a dovetailed shaped member formed integrally with and extending below the lower level of each plate at each of the other two corners to rest on the supporting rings of adjacent plates, a second series of plates, a dovetailed shaped member formed integrally with and extending below the lower level of each plate at each corner thereof and ribs on the underside bisecting the angles at each corner to enter one of the recesses in the ring on the first series, and a bitumen key in the centre of each ring and surrounding the dovetail members to lock the several plates in position whilst permitting movement of the upper plates in relation to the rings to allow for contraction or expansion of the plates.

3. A roadway having a surface formed from two series of juxtaposed triangular plates supported at their corners and laid on a bed of concrete or other material comprising a first series of plates, a dish shaped member formed integrally with and extending below the lower level of each plate at one corner thereof, a vertical wall at one side of the dish shaped member the inner face of said wall being undercut and the upper surface grooved, a dovetailed shaped member, the inclined face thereof corresponding with the inclined inner face of the vertical wall, formed integrally with and extending below the lower level of each plate at the other two corners to enter the dish shaped member of adjacent plates, ribs on the underside of the plate bisecting the angles at each corner to enter a groove in the upper surface of the vertical wall of adjacent plates, a second series of plates, a dovetailed shaped member, the inclined face thereof corresponding with the inclined inner face of the vertical wall, formed integrally with and extending below the lower level of each plate at each corner thereof to enter the dish shaped member of adjacent plates, ribs on the underside of the plate bisecting the angles at each corner to enter a groove in the upper surface of the vertical wall of adjacent plates and a bitumen key to fill in the dish shaped members and surround the dovetail members to lock the several plates in position whilst permitting movement of the upper plates in relation to the dish shaped member to allow for contraction or expansion of the plates.

WALTER HORRIDGE.